United States Patent [19]
Sanders et al.

[11] Patent Number: 5,979,151
[45] Date of Patent: Nov. 9, 1999

[54] HARVESTER WITH SELECTIVELY POSITIONABLE DEFLECTOR

[75] Inventors: Lambert Sanders, Herzebrock; Heinrich Isfort, Dülmen; Karl-Heinz Landwehr, Hagen a.T.W., all of Germany

[73] Assignee: Claas KGaA, Harsewinkel, Germany

[21] Appl. No.: 09/004,893

[22] Filed: Jan. 9, 1998

[30] Foreign Application Priority Data

Jan. 11, 1997 [DE] Germany .................. 297 00 426 U

[51] Int. Cl.⁶ .................................................. A01D 45/02
[52] U.S. Cl. .......................... 56/60; 56/16.6; 141/198; 460/114
[58] Field of Search .................. 56/60, 14.6, 16.6, 56/13.9, 14.5, 12.8, 16.4 R; 141/198, 231, 255; 460/114, 119; 414/345, 389, 340

[56] References Cited

U.S. PATENT DOCUMENTS 4,324,091  4/1982  Wistuba et al. .................. 56/16.6
5,167,581  12/1992  Haag .................................. 460/114
5,316,088  5/1994  Ries .................................. 172/510
5,575,316  11/1996  Pollklas ............................ 141/198

FOREIGN PATENT DOCUMENTS 23424      8/1883   Germany.
3316325A1  11/1984  Germany.
4435836A1  4/1996   Germany.

*Primary Examiner*—Robert E. Pezzuto
*Attorney, Agent, or Firm*—Husch & Eppenberger, LLC; Robert E. Muir

[57] ABSTRACT

A self-propelled chopper forage harvester has a flap assembly at the discharge end of a pivotable ejector pipe. A hydraulic actuator moves the flap assembly about a generally horizontal axis for directing the projection of the forage. The flap assembly is removably mounted so it can be either at a position at the top of the discharge end of the ejector pipe for filling open-top forage boxes or at a position 180 degrees therefrom and at the bottom of the discharge end for filling closed-top forage boxes.

13 Claims, 2 Drawing Sheets

HARVESTER WITH SELECTIVELY POSITIONABLE DEFLECTOR

BACKGROUND OF THE INVENTION

The present invention relates generally to agricultural machinery and more particularly to a harvester with a selectively positionable deflector or flap which is arranged at the discharge end of an ejector pipe or conduit.

Chopper forage harvesters of this type cut crop material, chop the material to a preselected length, and then project the chopped crop material into a forage box located either behind or adjacent the harvester. The forage box may be on a trailer towed by the harvester or on a truck. Both open-top and closed-top forage boxes are used. In the latter case one or more of the end walls or side walls has a filling opening adjacent its upper edge.

An apparatus to achieve filling an open-top forage box as evenly as possible is shown in German Patent 3,316,325 published Nov. 8, 1984. That patent shows a pivotable two-part flap at the output end of the ejector pipe, by which the angle of projection of the chopped crop material or forage can be changed according to the position of the flap. But such an arrangement cannot be used with a closed-top forage box which is filled through an opening in the side or end. In such a case it is the practice to remove the whole ejector pipe and replace it with one designed for directing the forage through the opening in the side or end of the forage box. It is desirable to be able to fill either an open-top or closed-top forage box without exchanging ejector pipes.

The present invention is directed to solving the above described problem in the prior art.

SUMMARY OF THE INVENTION

It is an object of the present invention to provide a harvester of the type described so that loading a forage box is possible selectively both through an open top or through an opening in the end or side without having to exchange the ejector pipe.

In accordance with the present invention there is provided a harvester with a flap assembly which is removably mounted at the top of the discharge end of a pivotable ejector pipe and pivoted by an actuator about a generally horizontal axis to direct the projection of the chopped crop material, wherein the flap assembly is moveable to another mounting position adjacent the bottom of the discharge end of the ejector pipe. Advantageously, spaced openings are provided adjacent the discharge end of the ejector pipe to selectively receive fasteners which mount the flap assembly at either of its positions. Spaced openings may also be provided for selectively mounting the actuator. Thus the flap assembly is removably mounted in such a way that it may be moved to a second position 180° from the position shown in German Patent 3,316,325. In this manner the flap assembly in its second position may, depending on its pivot position, also direct the projection the chopped crop into an opening in the end or side of a closed-top forage box. By varying its pivot position the flap assembly may help evenly fill the closed-top forage box. The fastener openings are arranged on the ejector pipe in a structurally advantageous manner, i.e. inversely symmetrically.

The flap assembly includes a first flap to which an auxiliary flap is pivotally connected. The position of the auxiliary flap is a function of the position of the first flap. This is accomplished by a link arm extending between the ejector pipe and the auxiliary flap. The link arm also is advantageously selectively mounted via one of two fastener openings in the ejector pipe. The flaps are advantageously operated by a hydraulic ram. According to another feature of the present invention, the piston rod of the hydraulic ram is hinged to the first flap.

BRIEF DESCRIPTION OF THE DRAWINGS

Reference is now made to the drawings which illustrate a preferred embodiment of the invention and wherein the same numerals indicate the same parts throughout the several figures.

DETAILED DESCRIPTION

Figure 1:
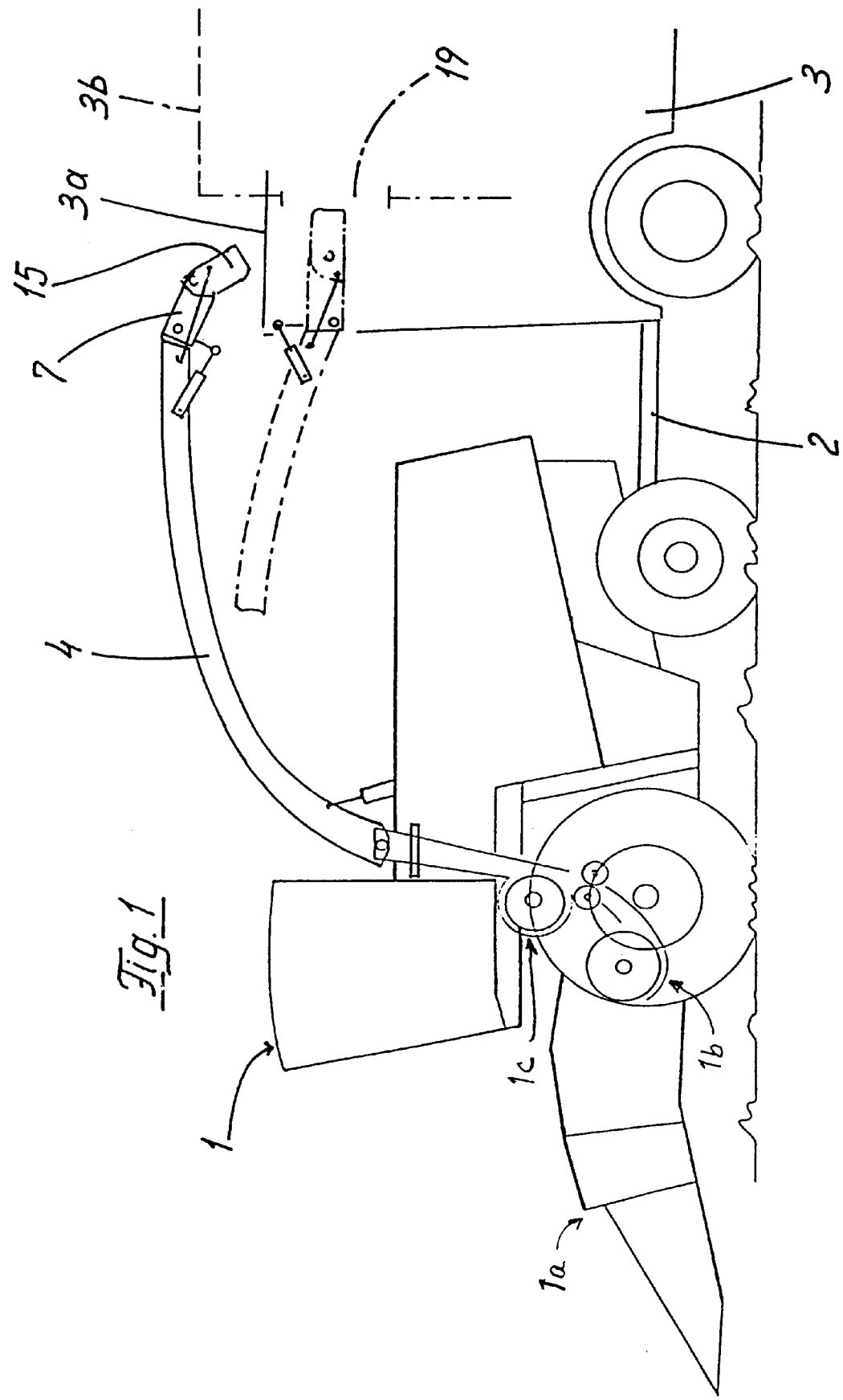
FIG. 1 is a side schematic of a self-propelled chopper forage harvester with a trailer.

A self-propelled chopper forage harvester, generally designated 1, includes a cutting mechanism 1a for cutting crop material, a chopping mechanism 1b for chopping the cut crop material to a preselected length, and an accelerating mechanism 1c for projecting the chopped crop material or forage through an ejector pipe 4. The harvester 1 has a trailer 3 attached by a tow bar 2. The trailer 3 can be a top-loading transport vehicle as shown in solid lines and designated 3a in FIG. 1. The ejector pipe 4 of the chopper forage harvester 1 and an associated flap arrangement or assembly 7,15 are also shown in solid lines. FIG. 2 is an enlarged view of this flap assembly 7,15 and shows that the ejector pipe 4 has two fastener openings 5 and 6 for selectively mounting the first flap 7. The fastener openings 5 and 6 are preferably constructed as threaded bores. In the embodiment shown, a first flap 7 is pivotally connected at the upper fastener opening 6 by a fastener 8 which conveniently is a threaded bolt. An identical arrangement exists on the opposite side.

Pivot movement of the flap assembly 7,15 is under control of an actuator 9 constructed as a piston and cylinder unit. A piston rod 10 is hinged to a depending boss of the first flap 7, and its associated cylinder 11 is pivotally connected to the ejector pipe 4. For this purpose the ejector pipe 4 has additional fastener openings 12 and 13 which can also be constructed as threaded bores. The cylinder 11 is pivotally connected to the lower opening 13 of the ejector pipe 4 by a fastening element conveniently constructed as a threaded bolt 14.

To more vary the discharge angle of the chopped crop within wide ranges, an auxiliary flap 15 is pivotally connected by bolts 16 to the first flap 7. A link arm 17 is pivotally connected to the ejector pipe 4 via a threaded fastener 22 and to the auxiliary flap 15. A second link arm 17 (not shown) is similarly arranged on the opposite side of the device. Each pivot position of the first flap 7 is assigned a precisely defined pivot position of the auxiliary flap 15. The pivot positions of flaps 7 and 15 with the piston rod 10 fully retracted are shown in broken lines. A biasing device in the form of a return spring 18 is attached at one end to an ear on the first flap 7 and at the other end to the auxiliary flap 15. The auxiliary flap 15 is acted upon in all possible positions by a force which seeks to turn the auxiliary flap in a counterclockwise direction as seen in FIG. 2.

Figure 2:
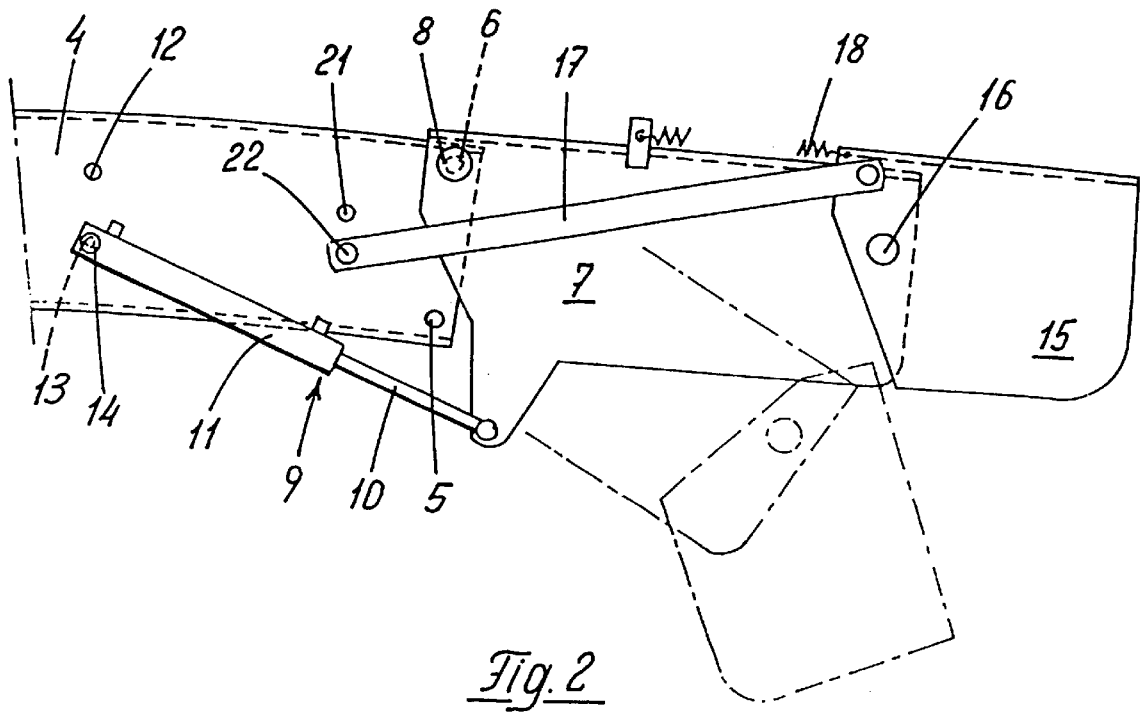
FIG. 2 is an enlarged side view of the discharge end of the ejector pipe and its associated flap assembly.

The flap assembly 7,15, when in the position shown in FIG. 2, can be used only to load an open-top transport vehicle 3a from above, as shown in solid lines in FIG. 1. In broken lines is shown a transport vehicle 3b which has a forage box with a closed or covered top and a filling opening 19 in the upper region of its vertical end wall. If the transport vehicle is self propelled, it can run alongside the harvester 1 and have a filling opening in one or both of its lateral sides.

Figure 3:
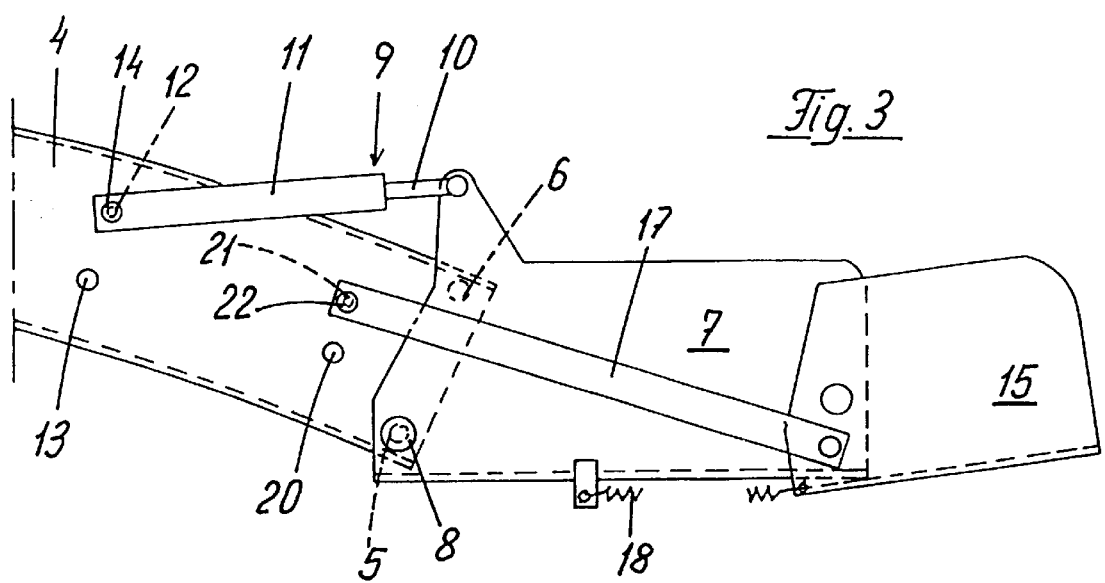
FIG. 3 is a view similar to FIG. 2 but with the ejector flap assembly turned 180°.

Since a closed-top forage box cannot be filled from the top, a preferred embodiment of the invention contemplates a different arrangement of the ejector pipe 4 and flap assembly 7,15. Their desired positions are shown in broken lines in FIG. 1 and in solid lines on a larger scale in FIG. 3. It can be seen that the flap assembly 7,15 in FIG. 3 is at a moved position which is inverted, i.e. turned 180°, from the position shown in FIG. 2. The first flap 7 is now pivotally connected by fastener 8 to the lower fastener opening 5. By comparing FIGS. 2 and 3, one can see that there are two fastener openings 20 and 21. In the inverted, FIG. 3 position, link arm 17 is pivotally mounted to the upper opening, namely 21, via fastener 22. Furthermore for operation of the flap assembly 7,15 in the inverted position, it is advantageous to use upper opening 12 of the two fastener openings 12 and 13 for pivotally mounting cylinder 11 of the actuator 9.

The above describes a removably-mounted flap assembly 7,15 usable in a first position (FIG. 2) for loading an open-top transport vehicle 3b from above and, in a moved, inverted position (FIG. 3) for loading a closed-top transport vehicle 3a through its end or side. In accordance with the present embodiment it is only necessary to provide another fastening option for the actuator 9, the links 17, and the first flap 7. As a result of this arrangement it is possible to move the whole flap assembly 7,15 in the simplest manner to a moved position turned 180° on the ejector pipe 4, and thereby perform another function.

Other objects, advantages and features of the present invention may be perceived by those skilled in the art or from the appended claims.

We claim:

1. In a self-propelled chopper forage harvester including a pivotable ejector pipe having a discharge end through which chopped crop is projected, a flap arrangement at the discharge end of the pivotable ejector pipe, means for mounting the flap arrangement on the ejector pipe, an actuator, and means mounting the actuator on the ejector pipe for moving the flap arrangement about an essentially horizontal axis for directing the projection of the chopped crop, the improvement comprising that the ejector pipe has two spaced mounting positions for both the flap and the actuator, and removable fasteners for selectively mounting the flap arrangement and the actuator on the ejector pipe at either one of the two mounting positions.

2. A self-propelled chopper forage harvester according to claim 1, wherein the mounting positions are arranged inversely symmetrically.

3. A self-propelled chopper forage harvester according to claim 1, wherein the actuator is a hydraulic ram.

4. A self-propelled chopper forage harvester according to claim 3, wherein the hydraulic ram has a piston rod hinged to the flap arrangement.

5. A self-propelled chopper forage harvester according to claim 1, wherein the flap arrangement includes a first flap mounted on the ejector pipe and an auxiliary flap pivotally connected to the first flap, and including a link interconnecting the ejector pipe and the auxiliary flap for pivoting the auxiliary flap as a function of the position of the first flap, and means for selectively mounting the link to the ejector pipe at either of two mounting positions thereon.

6. A self-propelled chopper forage harvester according to claim 5, wherein each set of mounting positions is arranged inversely symmetrically.

7. A self-propelled chopper forage harvester according to claim 6, wherein the actuator has a piston rod pivotally connected to the first flap.

8. A harvester including a chopping mechanism for chopping cut crop material, a pivotable ejector pipe having a discharge end, an accelerating mechanism for projecting the chopped crop material through the ejector pipe, a flap assembly at the discharge end of the ejector pipe, an actuator for moving the flap assembly relative to the ejector pipe for directing the projection of the chopped crop material, and means for removably mounting the flap assembly for movement from a first position at the top of the discharge end of the ejector pipe to a second position removed therefrom.

9. A harvester as set forth in claim 8, wherein the second position is about 180 degrees from the first position and at the bottom of the discharge end of the ejector pipe.

10. A harvester as set forth in claim 8, wherein the ejector pipe has spaced openings at its discharge end to define a mounting location for each first and second positions, and the removable mounting means includes a fastener which mounts the flap assembly at either of its positions.

11. A harvester as set forth in claim 10, including a second set of spaced openings for selectively mounting the actuator.

12. A harvester as set forth in claim 11, wherein the flap assembly includes a first flap mounted on the ejector pipe and an auxiliary flap pivotally connected to the first flap, and including a link interconnecting the ejector pipe and the auxiliary flap for pivoting the auxiliary flap as a function of the position of the first flap, and a third set of spaced openings for selectively mounting the link to the ejector pipe.

13. A harvester as set forth in claim 12, wherein each set of mounting positions is arranged inversely symmetrically.

* * * * *